(12) United States Patent
Soldan

(10) Patent No.: US 9,094,564 B2
(45) Date of Patent: Jul. 28, 2015

(54) CLOCK SYNCHRONIZATION FOR SHARED MEDIA PLAYBACK

(75) Inventor: Eric Soldan, Saratoga, CA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 245 days.

(21) Appl. No.: 12/776,301

(22) Filed: May 7, 2010

(65) Prior Publication Data

US 2011/0276648 A1 Nov. 10, 2011

(51) Int. Cl.
| | |
|---|---|
| G06F 15/16 | (2006.01) |
| H04J 3/06 | (2006.01) |
| H04N 7/12 | (2006.01) |
| H04L 7/00 | (2006.01) |
| H04N 7/20 | (2006.01) |
| H04N 5/04 | (2006.01) |

(Continued)

(52) U.S. Cl.
CPC .. *H04N 5/04* (2013.01); *G06F 1/12* (2013.01); *H04J 3/0664* (2013.01); *H04N 21/4305* (2013.01)

(58) Field of Classification Search
CPC ..... H04J 3/0638; H04J 3/0697; H04J 3/0685; H04J 3/0682; H04J 3/0658; H04J 3/0632; H04J 3/0635; H04J 3/06; H04W 56/00; G06F 1/12; G06F 1/14; G06F 1/10; G06F 1/04
USPC ........................................................ 709/208
See application file for complete search history.

(56) References Cited

U.S. PATENT DOCUMENTS

| | | | |
|---|---|---|---|
| 5,668,601 A | * | 9/1997 | Okada et al. ............. 375/240.25 |
| 5,966,387 A | | 10/1999 | Cloutier |
| 6,370,159 B1 | | 4/2002 | Eidson |

(Continued)

FOREIGN PATENT DOCUMENTS

| | | |
|---|---|---|
| EP | 1455473 A2 | 9/2004 |
| EP | 1921783 A1 | 5/2008 |

(Continued)

OTHER PUBLICATIONS

"Introduction to Distributed Clock Synchronization and the IEEE 1588 Precision Time Protocol", Retrieved at << http://zone.ni.com/devzone/cda/tut/p/id/2822 >>, May 14, 2008, pp. 5.

(Continued)

*Primary Examiner* — Phuoc Nguyen
*Assistant Examiner* — Kishin G Belani
(74) *Attorney, Agent, or Firm* — Micah Goldsmith; Judy Yee; Micky Minhas

(57) ABSTRACT

Various embodiments are provided that relate to clock synchronization. In one embodiment, a method for synchronizing a relative clock to a global clock comprises receiving a network packet from a master computing device, the network packet including a network packet time stamp indicating a system time of the global clock when the network packet was transmitted; determining a receipt time offset between a receipt time of the network packet and the network packet time stamp, the receipt time indicating a time at which the network packet is received as measured by the relative clock; and adjusting a system time of the relative clock toward the system time of the global clock by updating a system time offset to the receipt time offset if the receipt time offset is smaller than the system time offset.

20 Claims, 8 Drawing Sheets

(51) Int. Cl.
*G06F 1/12* (2006.01)
*H04N 21/43* (2011.01)

(56) References Cited

U.S. PATENT DOCUMENTS

| | | | |
|---|---|---|---|
| 7,876,791 B2* | 1/2011 | Jung et al. | 370/503 |
| 2003/0179780 A1 | 9/2003 | Walker et al. | |
| 2005/0180511 A1 | 8/2005 | Arafune et al. | |
| 2006/0013263 A1 | 1/2006 | Fellman | |
| 2006/0248559 A1* | 11/2006 | Michener et al. | 725/67 |
| 2006/0256820 A1* | 11/2006 | Ilnicki et al. | 370/503 |
| 2007/0092224 A1 | 4/2007 | Tsukagoshi et al. | |
| 2007/0147435 A1* | 6/2007 | Hamilton et al. | 370/503 |
| 2008/0243950 A1 | 10/2008 | Webman et al. | |
| 2008/0243952 A1 | 10/2008 | Webman et al. | |
| 2009/0310726 A1* | 12/2009 | Alankry et al. | 375/359 |
| 2010/0098111 A1* | 4/2010 | Sun et al. | 370/509 |

FOREIGN PATENT DOCUMENTS

| | | | |
|---|---|---|---|
| EP | 2141922 A1 | 1/2010 | |
| WO | 2004043032 A2 | 5/2004 | |

OTHER PUBLICATIONS

Gonzalez, et al., "Synchronization Architecture for DVB-H Seamless Handover", Retrieved at << http://ieeexplore.ieee.org//stamp/stamp.jsp?tp=&arnumber=04559448 >>, IEEE International Symposium on Consumer Electronics, Apr. 14-16, 2008, pp. 4.

Tatlas, et al., "An Error—Concealment Technique for Wireless Digital Audio Delivery", Retrieved at << http://www.wcl.ee.upatras.gr/audiogroup_oldsite/Publications/Full%20Papers/pub_fpr.pdf >>, In Proceedings of the 5th International Conference on Communication Systems, Networks and Digital Signal Processing (CSNDSP '06), Jul. 2006, pp. 181-184.

"Related Technology", Retrieved at << http://www.bytefusion.com/products/ntm/ptnt/1_1relatedtechnology.htm >>, Retrieved Date: Jan. 28, 2010, pp. 2.

Mills, David L., "Executive Summary—Computer Network Time Synchronization", Retrieved at << http://doc.ntp.org/4.1.0/exec.htm >>, Retrieved Date: Jan. 28, 2010, pp. 6.

Williams, John, "Troubleshooting IP Broadcast Video Quality of Service," Lightwaveonline.com, <<http://www.lightwaveonline.com/test-and-measurement/troubleshooting-ip-broadcast-video-quality-of-service-53426332.html>>, Jan. 4, 2006, Retrieved date: May 7, 2010, pp. 4.

"International Search Report", Mailed Date: Dec. 19, 2011, Application No. PCT/US2011/034710, Filed Date: May 1, 2011, pp. 9.

ISA European Patent Office, Search Report for European Patent Application No. 11778082.5, Jan. 20, 2014, 3 pages.

ISA European Patent Office, Office Action for European Patent Application No. 11778082.5, Jan. 30, 2014, 7 pages.

* cited by examiner

| EXAMPLE CLOCK CORRECTION 700 | | | |
|---|---|---|---|
| UNADJUSTED RELATIVE CLOCK 702 | RELATIVE CLOCK CORRECTION TARGET 704 | RELATIVE CLOCK CORRECTION ALGORITHM 706 | ADJUSTED RELATIVE CLOCK 708 |
| 0 | +5 TICKS | 1 | 1 |
| 3003 | +5 TICKS | 2 | 3005 |
| 6006 | +5 TICKS | 3 | 6009 |
| 9009 | +5 TICKS | 4 | 9013 |
| 12012 | +5 TICKS | 5 | 12017 |

FIG. 7

FIG. 8
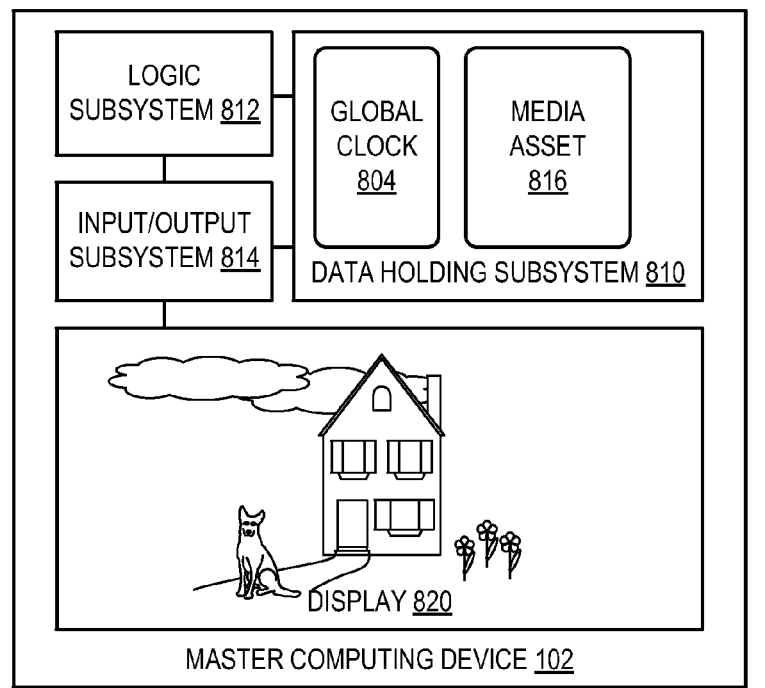
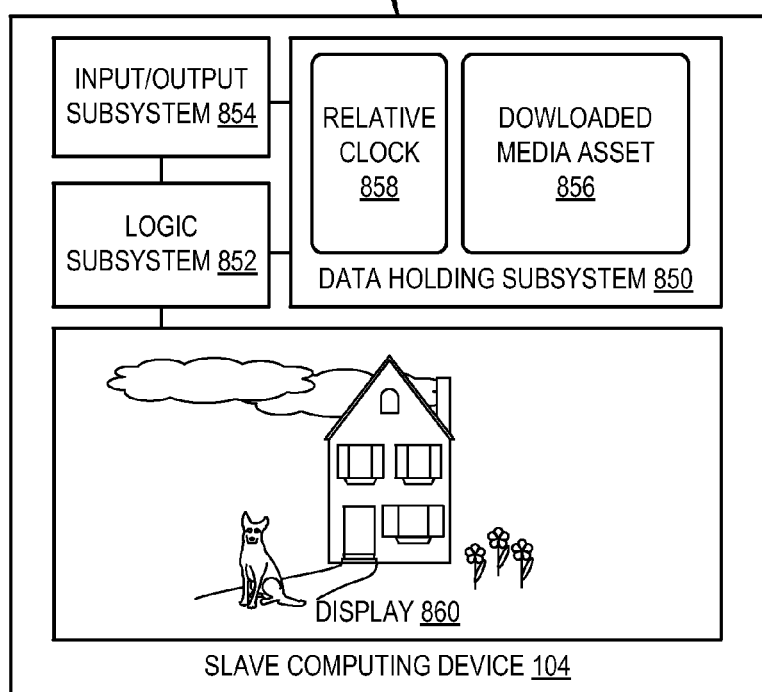

CLOCK SYNCHRONIZATION FOR SHARED MEDIA PLAYBACK

BACKGROUND

Synchronizing media playback between a plurality of media playback device requires the establishment of a clock time shared among the playback devices so that an audio signal heard on one device matches video displayed on another, so that playback on one device does not lag behind playback on another, etc. Some approaches use a separate synchronization time server which sends and receives time stamps to and from each playback device.

However, such approaches have high network traffic overhead and computational burdens, as each device must send, receive, and decode time stamps to the synchronization time server to establish the shared clock. Further, such approaches may also improperly assume that inbound and outbound network traffic speeds are symmetric, which may lead to additional computational burden when correcting the improper assumption.

SUMMARY

Accordingly, various embodiments are provided herein that relate to clock synchronization for synchronizing media presentation at a master computing device with a slave computing device. For example, in one embodiment, a method for synchronizing a relative clock of a slave computing device to a global clock of a master computing device is provided. The method comprises receiving a network packet from the master computing device, the network packet including a network packet time stamp indicating a system time of the global clock when the network packet was transmitted. Further, the method comprises determining a receipt time offset between a receipt time of the network packet and the network packet time stamp, the receipt time indicating a time at which the network packet is received at the slave computing device as measured by the relative clock. Further still, the method comprises adjusting a system time of the relative clock toward the system time of the global clock by updating a system time offset between the system time of the relative clock and the system time of the global clock to the receipt time offset if the receipt time offset is smaller than the system time offset.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 7 shows a table indicating proportional adjustments to a relative clock responsive to a relative clock correction target set by a system time offset in accordance with an embodiment of the present disclosure.

FIG. 8 schematically shows an embodiment of a media computing system including a master computing device and a slave computing device in accordance with an embodiment of the present disclosure.

DETAILED DESCRIPTION

Figure 1:
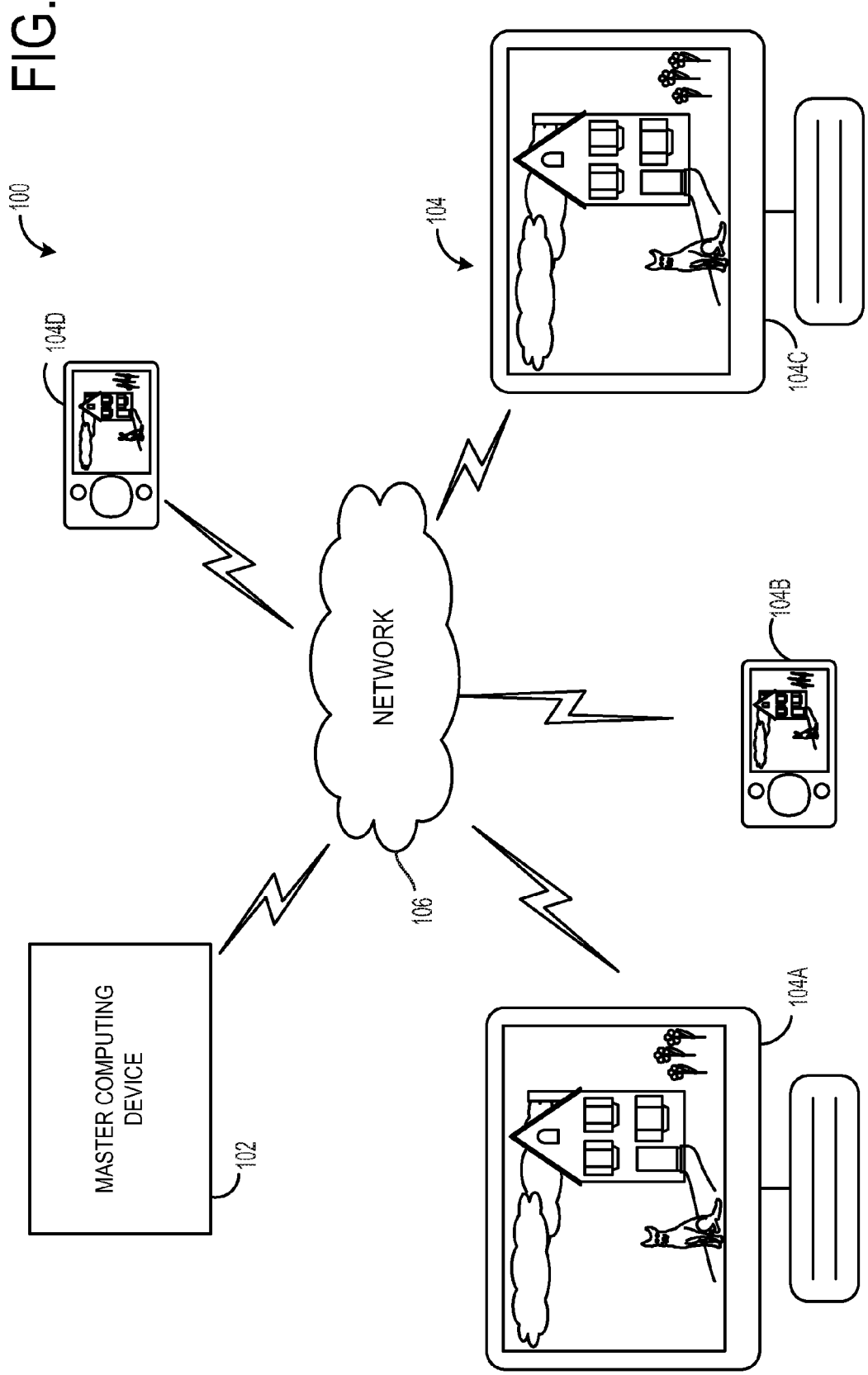
FIG. 1 schematically shows an operating environment of a synchronized media presentation system in accordance with an embodiment of the present disclosure.

FIG. 1 is a schematic view of an operating environment of a synchronized media presentation system 100. In one example, a media asset is synchronized in a manner that facilitates group experience of the media asset. Put another way, the media asset may be synchronized across the different presentation devices so that the participants may share a media presentation experience in a synchronized fashion even though some participants may be remotely located from one another. In another example, a video portion of the media asset is presented at the master computing device while an audio portion of the media asset may be transmitted to a slave computing device, such as an audio headset, so that a user wearing the headset may control audio independently of other users.

As described above, such a shared media presentation may require that the various computing devices have a shared system time. While the shared system time may be arbitrary, asynchronous presentation of the media may lead to a degraded media experience. Because individual clocks of the various computing devices may drift slower or faster relative to one another, various approaches for synchronizing the individual clocks to one another are presented in more detail below.

Synchronized media presentation system 100 is shown including a master computing device 102 and one or more slave computing devices 104 connected by a network 106. Master computing device 102 is configured to distribute, via network 106, a variety of media assets. For example, the media assets may include audio-visual media (e.g., movies, live entertainment broadcasts, photo slide shows, etc.) located on master computing device 102 or on removable computer-readable media stored thereon (not shown), streamed from a media server of a network communication partner, etc. In the interest of clarity, the examples described below are primarily presented as movie media assets; however, it will be appreciated that any suitable media asset may be distributed from master computing device 102.

Slave computing devices 104 may include televisions, television set top boxes, media players, personal computers, mobile communication devices, smartphones, or any suitable playback device configured to play network-delivered media assets. For example, FIG. 1 shows four slave computing devices 104A-104D of varying configuration, though it will be appreciated that any suitable number of slave computing devices 104 may be included in synchronized media presentation system 100.

Figure 2:
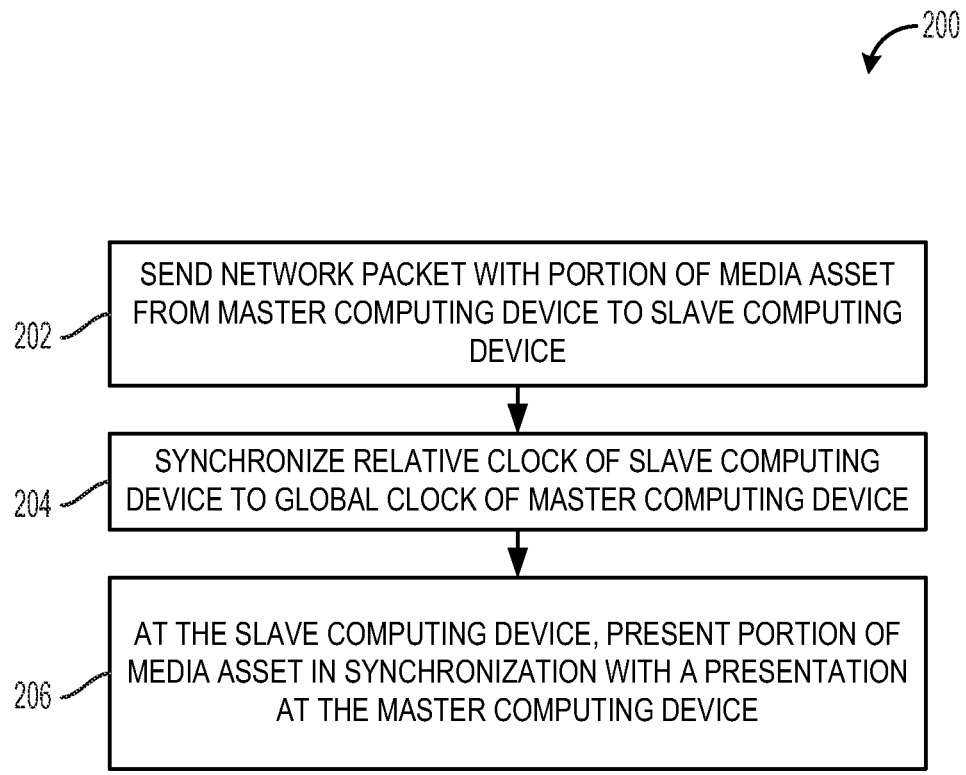
FIG. 2 shows an example method of synchronizing a media presentation in accordance with an embodiment of the present disclosure.

FIG. 2 shows an example method 200 of synchronizing a media presentation shared between a master computing device and at least one slave computing device. Method 200 may be performed by any suitable hardware and/or software. As a non-limiting example, method 200 may be performed by master computing device 102 and/or slave computing device 104.

Figure 3:
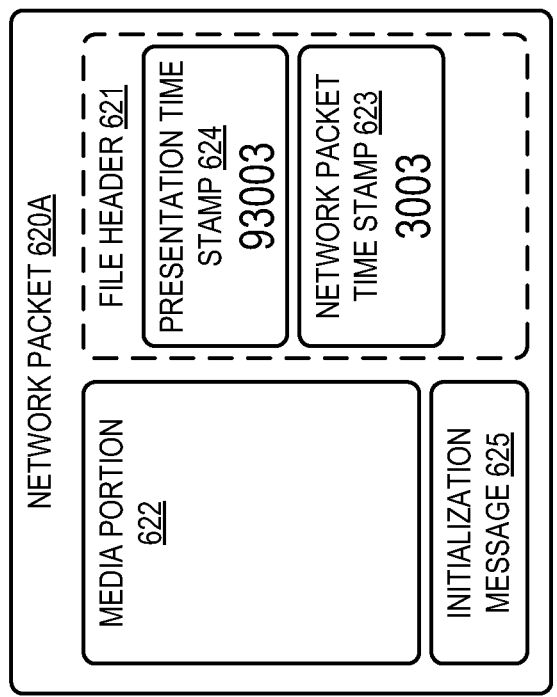
FIG. 3 schematically shows an embodiment of a network packet in accordance with an embodiment of the present disclosure.

Method 200 comprises, at 202, sending a network packet from the master computing device to the slave computing device. The network packet includes a portion of the media asset to be presented at the slave computing device in synchronization with presentation at the master computing device. For example, FIG. 3 shows a network packet 620A including media portion 622. Media portion 622 may be any suitable portion of the media asset. In some embodiments, media portion 622 is a subdivision of the media asset sized according to a network capacity, a computing capacity of slave computing device 104, etc. However, it will be appreciated that media portion 622 may also comprise the whole media asset in some other embodiments.

It will be appreciated that different computing devices may have clocks that progress at various different rates relative to each other. For example, a relative clock of a slave computing device may drift by a few seconds with respect to a global clock of a master computing device over the course of a day, a week, a month, etc. While both the relative and global clocks may be relatively consistent with respect to each other on a short time scale, such as a time for network packet transmissions between the two devices, the accumulated drift may cause a noticeable clock offset during media presentations that should otherwise be synchronized. Thus, method 200 comprises, at 204, synchronizing a relative clock of the slave computing device to a global clock of the master computing device. One example of a method of such synchronization is shown in FIG. 4, and is described in more detail below.

Figure 4:
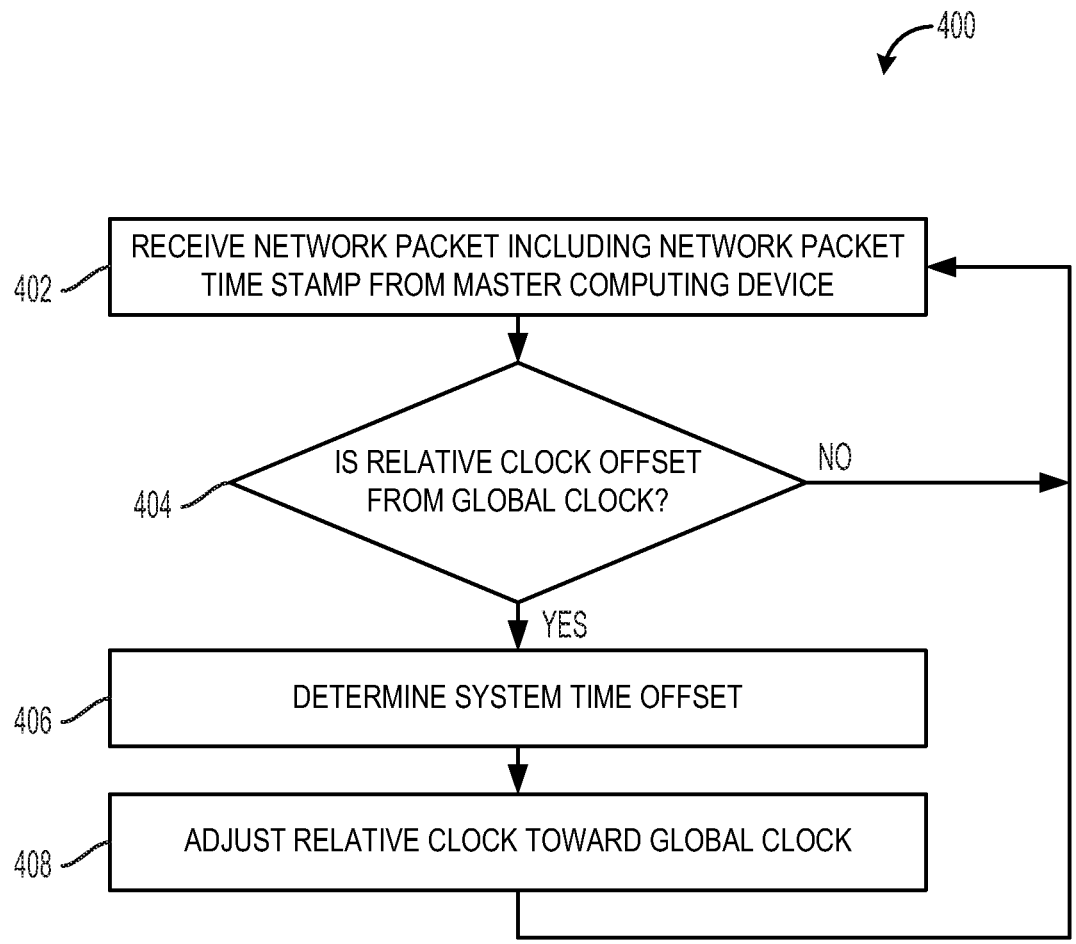
FIG. 4 shows an example method of synchronizing a relative clock with a global clock in accordance with an embodiment of the present disclosure.

FIG. 4 shows an example method 400 for synchronizing the relative clock of the slave computing device to the global clock of the master computing device based on transmission information for network packets sent from the master computing device to the slave computing device. The clock synchronization method described herein is unidirectional; it relies only on network packet time stamps sent from the master computing device to the slave computing device. Thus, the slave computing device does not need to send confirmatory time stamped packets back to the master computing device or to a time synchronization server. This may reduce network traffic, reduce computational burdens at the master computing device, and/or provide a synchronization method that is agnostic to asymmetrical network traffic speeds. Method 400 may be performed by any suitable hardware and/or software. As a non-limiting example, method 400 may be performed by master computing device 102 and/or slave computing device 104.

Method 400 comprises, at 402, receiving a network packet from the master computing device. The network packet may include a network packet time stamp indicating a system time of the global clock when the network packet was transmitted. The network packet may be received by the slave computing device in response to the master computing device sending the network packet. In some embodiments, the network packet includes a relative clock initialization message for initializing the system time of the relative clock. In one example, a relative clock initialization message may instruct the slave computing device to initialize the system time of the relative clock to "0" ticks. In another example, a relative clock initialization message may instruct the slave computing device to initialize the system time to a system time of the global clock when the network packet was sent. In some embodiments, the slave computing device may automatically initialize its clock responsive to receiving a network packet (e.g., an initial network packet).

Network packet time stamps included in the network packet are configured for use in synchronizing the relative clock of the slave computing device to the global clock of the master computing device. The network packet time stamp indicates a system time of a global clock of the master computing device when the network packet bearing the network packet time stamp was transmitted. In the example shown in FIG. 3, network packet time stamp 623 has a value of "3003" ticks, indicating that the global clock of the master computing device had a system time of "3003" ticks when network packet 620A was transmitted from the master computing device. In some embodiments, the network packet time stamp may be included in metadata of the network packet. In some embodiments, the network packet time stamp may be included in a file header of the network packet.

Method 400 comprises, at 404, determining whether the system time of the relative clock of the slave computing device is offset from the system time of the global clock of the master computing device. Determination of the system time offset permits the relative and the global clocks to be synchronized to one another so that presentation of the media asset may be synchronized between the master and slave computing devices. Accordingly, if there is no system time offset between the clocks, the clocks are considered to be synchronized and the method returns to 402 to await receipt of the next network packet from the master computing device. If there is an offset between the clocks, method 400 continues to 406, where determination of the system time offset is made.

Figure 5:
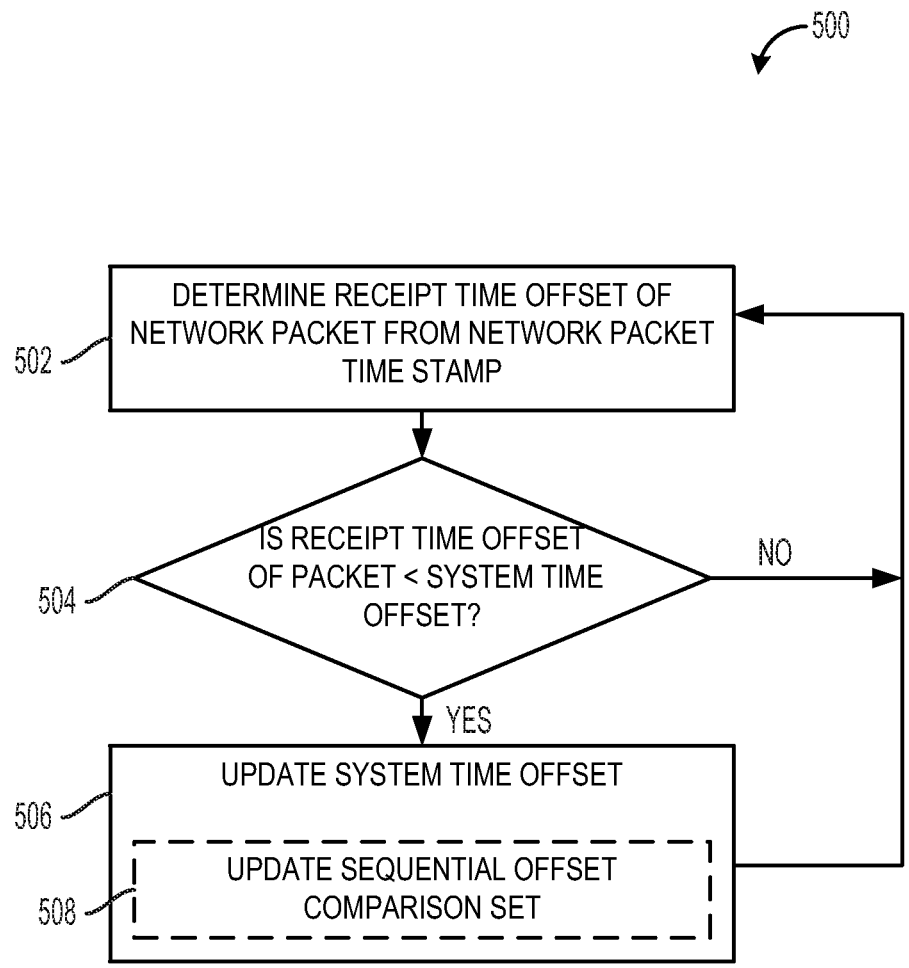
FIG. 5 shows an example method of determining a system time offset between a relative clock and a global clock in accordance with an embodiment of the present disclosure.

One example of a method 500 of determining a system time offset is shown in FIG. 5, which is illustrated with reference to FIG. 6 below. Method 500 may be performed by any suitable hardware and/or software. For example, method 500 may be performed by master computing device 102 and/or slave computing device 104.

Method 500 comprises, at 502, determining a receipt time offset between a receipt time of the network packet and the network packet time stamp. The receipt time indicates a time at which the network packet is received at the slave computing device as measured by the relative clock of the slave computing device; thus, the receipt time offset represents a combination of network transmission time and offset between the global and the relative clocks.

Figure 6:
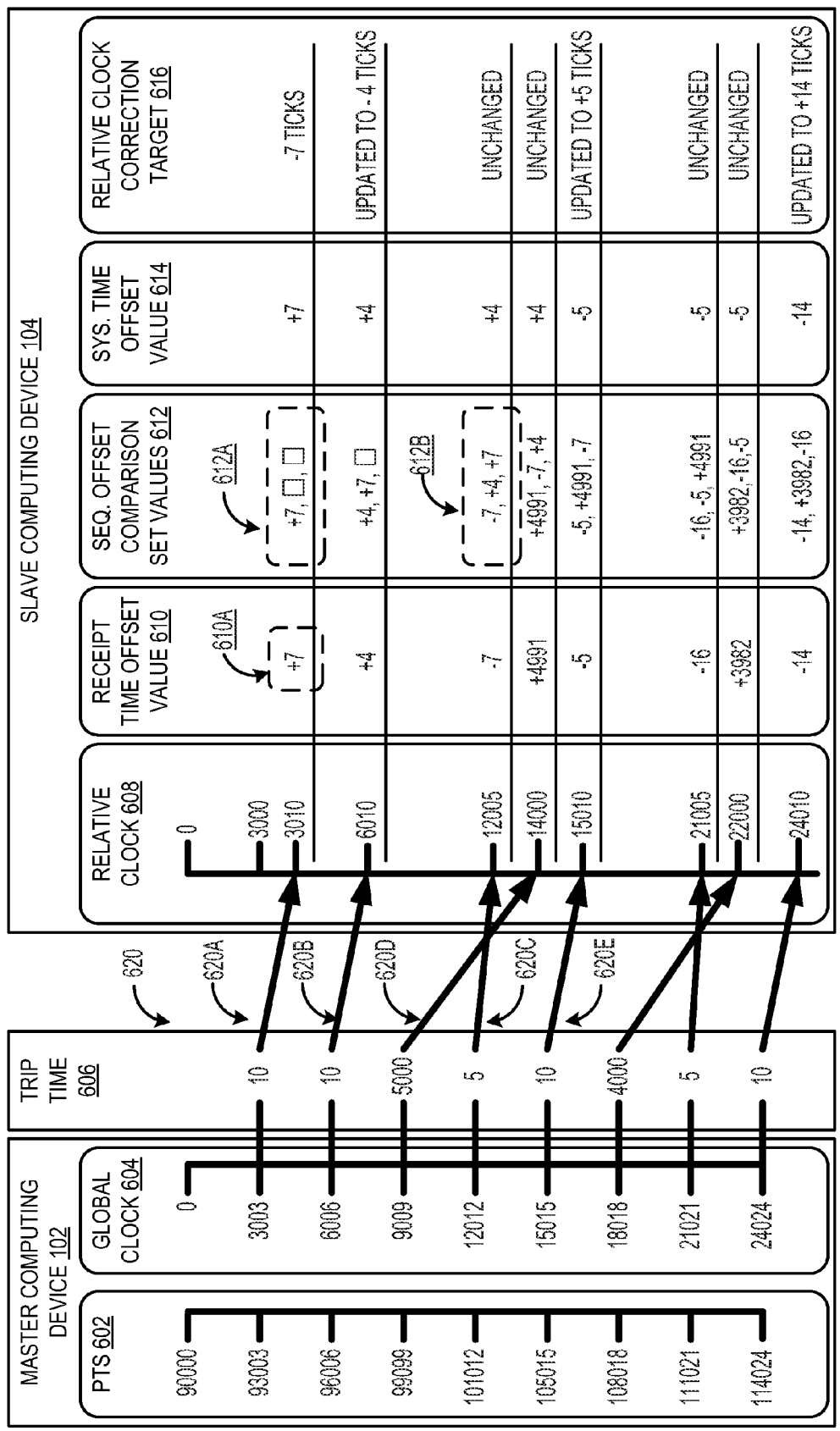
FIG. 6 schematically shows an example of synchronization of a relative clock of a slave computing device to a global clock of a master computing device using system time offsets determined from network packet transmission information in accordance with an embodiment of the present disclosure.

For example, FIG. 6 schematically shows a time sequence in which master computing device 102 has system time entries of a global clock 604 and slave computing device 102 has corresponding system time entries for an unadjusted relative clock. Each "tick" in FIG. 6 represents an addition to the system time of the global or relative clock according to an interrupt frequency of the respective computing device. Any suitable interrupt frequency may be employed; common interrupt frequencies include, but are not limited to, 50 Hz, 60 Hz, 100 Hz, 90000 Hz, etc. For example, if the interrupt frequency is 100 Hz, 1 tick is added to the clock every $\frac{1}{100}^{th}$ of a second, or every 10 milliseconds. For simplicity, both global clock 604 and relative clock 608 are depicted in FIG. 6A as having an initial value of "0" ticks. In the example shown in FIG. 6A, the relative clock is "slower" than the master clock—the common time interval ending at a system time of "3003" ticks at global clock 604 shows a system time of "3000" ticks at unadjusted relative clock 608.

FIG. 6 shows master computing device 102 transmitting network packet 620A when global clock 604 has a system time value of "3003" ticks. Network packet 620A has an elapsed network trip time 606 of "10" ticks; that is, it takes ten ticks of global clock 604 for network packet 620A to make the trip to slave computing device 104. It will be appreciated that in some embodiments, clock drift between the global clock and the relative clock may be negligible over time intervals approximately the same as that for network transmission. It is to be understood that, for illustrative purposes, the examples described with reference to FIG. 6 have exaggerated clock drifts, network latencies, etc.

Network packet 620A is shown as being received at slave computing device 104 when relative clock 608 has a system time value of "3010" ticks. The receipt time offset 610 for network packet 620A is determined by subtracting the network packet time stamp 623 from the system time of relative clock 608 when network packet 620A is received. In this example, "3010" ticks–"3003" ticks="+7" ticks, as shown at 610A of FIG. 6.

Continuing with FIG. 5, method 500 comprises, at 504, comparing the receipt time offset to a system time offset of the slave computing device. The system time offset provides a relative clock correction target used by the slave computing device when adjusting the system time of the relative clock toward the system time of the master clock. Because smaller system time offsets may reflect shorter, speedier network travel times, selecting the smaller of the system time and receipt time offsets may more accurately reflect the true offset between the relative and the global clocks. In one scenario, an earlier-sent network packet arrives after a later-sent network packet; thus, the earlier-sent network packet may have a comparatively large trip time. For example, FIG. 6 shows that network packet 620D, sent at "9009," has a trip time of "5000" ticks; network packet 620C, sent at "12012," has a trip time of "5" ticks. Because the trip time for network packet 620C is a comparatively smaller portion of the offset between the clocks than it is for network packet 620D, the receipt time offset associated with network packet 620C better reflects the offset between the relative and the global clocks.

In some embodiments, the system time offset may be initially set as the value of the first receipt time offset, and may remain at this value until replaced by a subsequent receipt time offset that satisfies an update criterion for updating the system time offset value. In the example shown in FIG. 6, system time offset value 614 is initially set at "+7" ticks based on the receipt time offset 610 of network packet 620A. This may expedite system time synchronization between the global and the relative clocks. In some other embodiments, the initial system time offset may remain unset until a suitable sample size of receipt time offset values have been determined. For example, a slave computing device may determine receipt time offsets for the first three network packets before selecting the system time offset based on an initial selection criterion, such as selecting the smallest absolute value, the average value, or other suitable selection criterion. This may diminish the potential effects of network transmission jitter on the initial value of the system time offset and ultimately on clock synchronization.

If the receipt time offset is larger than the system time offset, method 500 makes no change to the system time offset and returns to 502. In some embodiments, the system time offset is not updated if an absolute value of the receipt time offset is larger than an absolute value of the system time offset. Updating the system time offset according to a comparison of absolute values of system time offsets and receipt time offsets allows the determination of a smaller relative clock correction target independently of network packets that arrive out of order at the slave computing device. For example, network packet 620C, shown in FIG. 6, arrives immediately after network packet 620B, and has a receipt time offset of "−7" ticks. While the receipt time offset of network packet 620C has a numerical value less than "+4" ticks, the absolute value of "−7" ticks is greater than the absolute value of "+4" ticks. Consequently, system time offset 614 is not updated upon receipt of network packet 620C in the embodiment shown in FIG. 6.

Continuing with FIG. 5, if the receipt time offset is smaller than the system time offset, method 500 proceeds to 506, where the system time offset is updated. In some embodiments, the system time offset is updated to the value of the most recently determined receipt time offset. In the example shown in FIG. 6, system time offset 614 initially has a value of "+7" ticks. Subsequently, network packet 620B arrives at slave computing device 104. Network packet 620B has a receipt time offset 610 of "+4" ticks. Because the receipt time offset of "+4" ticks is less than the system time offset of "+7" ticks, the system time offset 614 is updated to "+4" ticks. It will be appreciated that, similarly to the discussion above, in some embodiments, the system time offset is updated if an absolute value of the receipt time offset is smaller than an absolute value of the system time offset.

In some embodiments, updating the system time offset, as shown at 506 of FIG. 5 may comprise updating the system time offset to the receipt time offset if the receipt time offset is smaller than each member of a sequential offset comparison set. The sequential offset comparison set may comprise a set membership including a plurality of sequentially-received previously determined receipt time offsets. The sequential offset comparison set provides a dynamically-updated population of previously determined receipt time offsets against which a subsequently determined receipt time offset may be compared. For example, FIG. 6 shows a series of sequential offset comparison sets 612, each having a set membership size of three. In some embodiments, the set membership size may be configurable. For example, a larger set membership size may be selected, providing a more robust synchronization routine; in some other embodiments, a smaller set membership size may be selected, providing a more sensitive synchronization routine.

The number of set members in the sequential offset comparison set may vary as the set membership size is adjusted up or down and/or during the initial population of the set. In the example shown in FIG. 6, sequential offset comparison set 612A has a set membership number of one, as only one receipt time offset 610 had been determined at that point. Sequential offset comparison set 612B has a set membership number equal to the set membership size of three. In some embodiments, the system time offset is only updated if the set membership number exceeds a membership size, an initial sample set size, etc.

Embodiments of updating the system time offset including a sequential offset comparison set comprise, at 508, updating the set membership of the sequential offset comparison set on a first-in, first-out basis by removing an earlier-determined set member when addition of a later-determined set member causes a set membership number to exceed a configurable set membership size. In the example shown in FIG. 6, receipt of network packet 620D causes sequential offset comparison set 612B to be updated by displacing the set member "+7" with set member "+4991." When network packet 620E is received, sequential offset comparison set 612 is updated to include "−5" and to remove "+4." At that point, the smallest member of sequential offset comparison set 612 is newly added "−5," so that system time offset 614 is updated to a value of "−5." Upon update of the system time offset, as shown at 506 of FIG. 5, method 500 returns to 502 to await determination of the next receipt time offset.

The updated system time offset is used to adjust the system time of the relative clock so that it progresses toward synchronization with the global clock. Returning now to FIG. 4, method 400 includes, at 408, adjusting the system time of the relative clock toward the system time of the global clock. Determining and updating the value of the system time offset as described above leads to updating a relative clock correction target of the slave computing device.

The relative clock correction target indicates to a suitable clock correction algorithm in which direction and by how many ticks the relative clock should be adjusted. In some embodiments, such as the embodiment shown in FIG. 6, the relative clock correction target is set equal to the negative of the numerical value of the system time offset. In the example of FIG. 6, setting a relative clock correction target 616 to be the negative of the numerical value of system time offset value 614 drives the glide slope of the relative clock to approach the system time of the global clock. It will be appreciated that some embodiments may modify the system time offset by a suitable weighting factor, etc. when determining the relative clock correction target.

A relative clock correction algorithm may be configured to adjust gradually a clock in the direction of the relative clock correction target. For example, a clock correction algorithm may be configured to adjust a clock by 1 part-per-million (ppm), or 1 tick for every 1,000,000 ticks, every few seconds, so that the clock may be gradually steered toward a goal. Note that the example shown in FIG. 6 shows a relatively small portion of the global and relative clocks' progressions, so the effect of the gradual clock correction algorithm is not noticeable.

Thus, for illustrative purposes, FIG. 7 shows a table 700 indicating, for a relative clock correction target 704 of "+5" ticks, the progression of an adjusted relative clock 708 compared to an unadjusted relative clock 702 responsive to relative clock correction algorithm 706. In the example shown in FIG. 7, relative clock correction algorithm 706 adjusts the relative clock at the rate of 1 tick for every 3003 ticks until relative clock correction target 704 is achieved. However, the example of FIG. 7 is merely illustrative; it will be appreciated that suitable relative clock correction algorithms may vary according to various relative clock embodiments. For example, in some embodiments, the relative clock correction algorithm adjusts a frequency of a voltage-controlled crystal oscillator (VCXO) to adjust the relative clock. In one scenario, a VCXO may provide fine control of the relative clock, while in another scenario a VCXO may provide coarse control of the relative clock. Thus, it will be appreciated that any suitable correction algorithm may be employed, and that the rates of change produced by the algorithm may be varied linearly, nonlinearly, etc. according to a desired adjustment outcome and/or according to adjustment hardware.

Turning back to FIG. 4, once the process of adjusting the relative clock according to the relative clock correction target has been initiated, method 400 returns to 402 to await the next network packet and subsequent updates to the system time offset and the relative clock correction target. As such, in the example shown in FIG. 6, relative clock correction factor 616 is initially set to "−7" ticks before being updated to "−4" ticks, "+5" ticks, etc. according to updates to system time offset 614.

The synchronized global and relative clocks provide the synchronized system time for synchronized presentation of the media asset. Returning now to FIG. 2, method 200 comprises, at 206, presenting the portion of the media asset including the network packet when the system time of the relative clock reaches a start time indicated by the presentation time stamp. Thus, presentation of the media asset at the slave computing device will occur in synchronization with presentation of the media asset at the master computing device. The presentation time stamp indicates a start time for the media portion included in the associated network packet. For example, FIG. 3 shows a network packet 620A including a presentation time stamp 624. Presentation time stamp 624 has a value of "93003" ticks; thus, both the slave and the master computing devices are configured to begin playing media portion 622 when the synchronized global and relative clocks reach a value of "93003." Further, both slave and master computing devices are configured to play the media portion in synchronization with each other. Consequently, the presentation on each device will have the same duration and the same speed, creating a synchronized media experience for users. In some embodiments, the performance time stamp may be included in metadata of the network packet. In some other embodiments, the performance time stamp may be included in a file header of the network packet.

In some embodiments, the above described methods and processes may be tied to a computing system. As an example, FIG. 8 schematically shows a media computing system 800 that may perform one or more of the above described methods and processes. Media computing system 800 includes master computing device 102 and slave computing device 104, which are configured to communicate with one another via network 106.

Master computing device 102 includes a logic subsystem 812 and a data-holding subsystem 810. Master computing device 102 may optionally include a display 820 and/or other components not shown in FIG. 8. Similarly, slave computing device 104 includes a logic subsystem 852 and a data-holding subsystem 850. Master computing device 104 may optionally include a display 860 and/or other components not shown in FIG. 8.

Logic subsystem 812 may include one or more physical devices configured to execute one or more instructions. For example, the logic subsystem may be configured to execute one or more instructions that are part of one or more programs, routines, objects, components, data structures, or other logical constructs. Such instructions may be implemented to perform a task, implement a data type, transform the state of one or more devices, or otherwise arrive at a desired result. The logic subsystem may include one or more processors that are configured to execute software instructions. Additionally or alternatively, the logic subsystem may include one or more hardware or firmware logic machines configured to execute hardware or firmware instructions. The logic subsystem may optionally include individual components that are distributed throughout two or more devices, which may be remotely located in some embodiments. It will be appreciated that logic subsystem 852 of slave computing device 104 may be similarly configured.

Data-holding subsystem 810 may include one or more physical, non-transitory, devices configured to hold data and/or instructions executable by the logic subsystem to implement the herein described methods and processes. When such methods and processes are implemented, the state of data-holding subsystem 810 may be transformed (e.g., to hold different data). Data-holding subsystem 810 may include removable media and/or built-in devices. Data-holding subsystem 810 may include optical memory devices, semiconductor memory devices, and/or magnetic memory devices, among others. Data-holding subsystem 810 may include devices with one or more of the following characteristics: volatile, nonvolatile, dynamic, static, read/write, read-only, random access, sequential access, location addressable, file addressable, and content addressable. It will be appreciated that data-holding subsystem 850 of slave computing device 104 may be similarly configured. In some embodiments, logic subsystem 812 and data-holding subsystem 810 may be integrated into one or more common devices, such as an application specific integrated circuit or a system on a chip. Similarly, regarding some embodiments of slave computing device 104, logic subsystem 852 and data-holding subsystem 850 may be integrated into one or more common devices.

When included, displays 820 and/or 860 may be used to present a visual representation of data held by data-holding subsystems 810 and/or 850, respectively. As the herein described methods and processes change the data held by the data-holding subsystem, and thus transform the state of the data-holding subsystem, the state of display 820 may likewise be transformed to represent visually changes in the underlying data. Display 820 may include one or more display devices utilizing virtually any type of technology. Such display devices may be combined with logic subsystem 812 and/or data-holding subsystem 810 in a shared enclosure, or such display devices may be peripheral display devices. It will be appreciated that display 860 of slave computing device 104 may be similarly configured.

It is to be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A method for synchronizing a relative clock of a slave computing device to a global clock of a master computing device, the method comprising:
   receiving a network packet from the master computing device, the network packet being received after one or more other network packets, and the network packet including a network packet time stamp value indicating a system time of the global clock when the network packet was transmitted;
   determining a receipt time offset that is a difference between a receipt time of the network packet and the network packet time stamp value, the receipt time indicating a time at which the network packet is received at the slave computing device as measured by the relative clock;
   determining a prior receipt time offset that is a difference between a receipt time of a previously received network packet and a network packet timestamp value included in that previously received network packet;
   comparing the receipt time offset to the prior determined receipt time offset; and
   adjusting the system time of the relative clock toward the system time of the global clock by a relative clock correction target that is updated to match a negative value of the receipt time offset only if an absolute value of the receipt time offset is smaller than an absolute value of the prior determined receipt time offset.

2. The method of claim 1, further comprising:
   establishing a sequential offset comparison set, the sequential offset comparison set having a set membership comprising a plurality of sequentially-received previously determined receipt time offsets;
   updating the relative clock correction target to the negative value of the receipt time offset if the absolute value of the receipt time offset is smaller than the absolute value of each member of the sequential offset comparison set; and
   updating the set membership of the sequential offset comparison set on a first-in, first-out basis by removing an earlier-determined set member when addition of a later-determined set member causes a set membership number to exceed a configurable set membership size.

3. The method of claim 2, wherein updating the relative clock correction target further comprises only updating the relative clock correction target if the set membership number exceeds an initial sample set size.

4. The method of claim 1, wherein the network packet includes:
   a portion of a media asset for presentation at the slave computing device in synchronization with presentation at the master computing device, and
   a presentation time stamp indicating when the portion of the media asset should be presented.

5. The method of claim 4, further comprising presenting the portion of the media asset included the network packet when the system time of the relative clock reaches a start time indicated by the presentation time stamp so that presentation of the media asset at the slave computing device occurs in synchronization with presentation of the media asset at the master computing device.

6. The method of claim 5, further wherein one or both of the presentation time stamp and the network packet time stamp value are included in metadata of the media asset.

7. The method of claim 5, wherein one or both of the presentation time stamp and the network packet time stamp value are included in a file header added to the media asset by the master computing device.

8. The method of claim 1, further comprising adjusting the relative clock toward the system time of the global clock in proportion to the relative clock correction target.

9. The method of claim 1, wherein the slave computing device relies only on network packet time stamp values sent from the master computing device to synchronize the relative clock to the global clock.

10. The method of claim 1, wherein adjusting the system time of the relative clock further comprises gradually adjusting the system time of the relative clock in the direction of the relative clock correction target over time by adjusting the relative clock by a portion of the relative clock correction target at regular intervals in two or more temporally-separated steps.

11. A slave computing device configured to present a media asset in synchronization with a presentation of the media asset at a master computing device, the slave computing device comprising:
   a relative clock;
   a logic subsystem; and
   a data-holding subsystem holding instructions executable by the logic subsystem to:
      receive a network packet from the master computing device, the network packet being received after one or more other network packets, and the network packet including:
         a network packet time stamp value indicating a system time of a global clock of the master computing device when the network packet was transmitted by the master computing device,
a portion of the media asset to be presented at the slave computing device in synchronization with presentation at the master computing device, and
a presentation time stamp indicating when the portion of the media asset should be presented,
determine a receipt time offset that is a difference between a receipt time of the network packet and the network packet time stamp value, the receipt time indicating a time at which the network packet is received at the slave computing device as measured by the relative clock,
determine a prior receipt time offset that is a difference between a receipt time of a previously received network packet and a network packet timestamp value included in that previously received network packet;
compare the receipt time offset to the prior determined receipt time offset,
update the system time of the relative clock toward the system time of the global clock by a relative clock correction target that is updated to match a negative value of the receipt time offset if an absolute value of the receipt time offset is smaller than an absolute value of the prior determined receipt time offset,
present the portion of the media asset included in the network packet when the system time of the relative clock reaches a start time indicated by the presentation time stamp so that presentation of the media asset at the slave computing device occurs in synchronization with presentation of the media asset at the master computing device.

12. The device of claim 11, wherein the instructions are further executable to:
establish a sequential offset comparison set, the sequential offset comparison set having a set membership comprising a plurality of sequentially-received previously determined receipt time offsets;
update the relative clock correction target to the negative value of the receipt time offset if the absolute value of the receipt time offset is smaller than an absolute value of each member of the sequential offset comparison set; and
update the set membership of the sequential offset comparison set on a first-in, first-out basis by removing an earlier-determined set member when addition of a later-determined set member causes a set membership number to exceed a configurable set membership size.

13. The device of claim 12, wherein the instructions are further executable only to update the system time offset if the set membership number exceeds an initial sample set size.

14. The device of claim 11, wherein the instructions are further executable to adjust the relative clock toward the system time of the global clock in proportion to the relative clock correction target.

15. The device of claim 11, wherein one or both of the presentation time stamp and the network packet time stamp value are included in metadata of the media asset.

16. The device of claim 11, wherein one or both of the presentation time stamp and the network packet time stamp value are included in a file header added to the media asset by the master computing device.

17. The device of claim 11, wherein the slave computing device does not send a reply time stamp to the master computing device.

18. The device of claim 11, wherein adjusting the system time of the relative clock further comprises gradually adjusting the system time of the relative clock in the direction of the relative clock correction target over time by adjusting the relative clock by a portion of the relative clock correction target at regular intervals in two or more temporally-separated steps.

19. A method for presenting a media asset at a slave computing device in synchronization with a presentation of the media asset at a master computing device, the slave computing device comprising:
receiving a network packet from the master computing device, the network packet being received after one or more other network packets, and the network packet including:
a portion of the media asset to be presented at the slave computing device in synchronization with presentation at the master computing device,
a presentation time stamp indicating when the portion of the media asset should be presented, and
a network packet time stamp value indicating a system time of a global clock of the master computing device when the network packet was transmitted;
determining a receipt time offset that is a difference between a receipt time of the network packet and the network packet time stamp value, the receipt time indicating a time at which the network packet is received at the slave computing device as measured by the relative clock;
determining a prior receipt time offset that is a difference between a receipt time of a previously received network packet and a network packet timestamp value included in that previously received network packet;
updating a relative clock correction target to an absolute value of the receipt time offset if the absolute value of the receipt time offset is smaller than an absolute value of each member of a sequential offset comparison set comprising a plurality of sequentially-received previously determined receipt time offsets;
adjusting the system time of the relative clock toward the system time of the global clock in proportion to the relative clock correction target without sending a reply time stamp from the slave computing device to the master computing device; and
presenting the portion of the media asset included in the network packet when the system time of the relative clock reaches a start time indicated by the presentation time stamp so that presentation of the media asset at the slave computing device occurs in synchronization with presentation of the media asset at the master computing device.

20. The method of claim 19, further comprising updating a set membership of the sequential offset comparison set on a first-in, first-out basis by removing an earlier-determined set member from the sequential comparison set when addition of a later-determined set member causes a set membership number to exceed a configurable set membership size.

* * * * *